United States Patent [19]

Bulkley

[11] 4,233,409
[45] Nov. 11, 1980

[54] POLYMERIC BLEND

[75] Inventor: Charles W. Bulkley, East Longmeadow, Mass.

[73] Assignee: Monsanto Company, St. Louis, Mo.

[21] Appl. No.: 55,202

[22] Filed: Jul. 5, 1979

[51] Int. Cl.$^3$ .............................................. C08F 41/12
[52] U.S. Cl. ...................................................... 525/71
[58] Field of Search .......................................... 525/71

[56] References Cited

U.S. PATENT DOCUMENTS

| | | | |
|---|---|---|---|
| 3,074,906 | 1/1963 | Calvert | 525/71 |
| 3,170,964 | 2/1965 | Grabowski | 525/71 |
| 3,509,237 | 4/1970 | Aubrey | 525/71 |
| 3,576,910 | 4/1971 | Jastrzebski | 525/71 |
| 3,903,200 | 9/1975 | Cincera et al. | 525/71 |
| 3,928,495 | 12/1975 | Dalton | 525/71 |

*Primary Examiner*—V. P. Hoke
*Attorney, Agent, or Firm*—Joseph S. Nelson; William J. Farrington; Edward P. Grattan

[57] ABSTRACT

The present invention relates to a polymeric blend comprising first and second ABS polyblends, a grafted diene rubber terpolymer grafted with alkenyl aromatic and alkyl alkacrylate monomers, a block copolymer of conjugated diene and alkenyl aromatic monomers and a matrix copolymer of alkenyl aromatic and alkenyl nitrile monomers, said polymeric blend being ductile and tough at low temperatures.

12 Claims, No Drawings

POLYMERIC BLEND

BACKGROUND OF THE INVENTION

ABS polyblends are known in the art as a class of polymeric polyblends having diene rubber particles grafted with alkenyl aromatic and alkenyl nitrile monomers dispersed in a matrix copolymer of said monomers. Such polyblends are tough, chemical resistant and are classified as engineering plastic having high modulus in addition to toughness.

Such engineering plastics are gaining broad usage in autos, appliances, pipe and other uses where toughness and low energy fabrication is of importance. The engineering requirements for such plastics continue to increase particularly toughness at low temperatures wherein brittleness can be a problem for conventional ABS polyblends.

It is the objective of the present invention to provide polymeric blends that have improved low temperature properties and will not embrittle at temperatures of $-30°$ C. or lower having improved ductility at low temperatures while maintaining toughness.

SUMMARY OF THE INVENTION

The present invention relates to a polymeric blend composition comprising:

A. a first ABS polyblend having first grafted conjugated diene rubber particles with a particle size of about 0.7 to 10 microns, said first diene rubber particles having present about 1 to 5 parts of a monoalkenyl aromatic-alkenyl nitrile copolymer as grafted and occluded copolymer, said first grafted diene rubber particles having a rubber moiety present in an amount of about 1 to 15% by weight based on said first ABS polyblend, B. a second ABS polyblend having second grafted conjugated diene rubber particles with a particle size of about 0.01 to 0.50 microns, said second diene rubber particles being grafted with said copolymer as a superstrate in an amount of about 0.10 to 2.5 parts per part of diene rubber, said second grafted rubber particles having a rubber moiety present in an amount of about 2 to 50% by weight of said second ABS polyblend, C. a grafted conjugated diene rubber terpolymer said diene rubber grafted with alkenyl aromatic and alkyl alkacrylate monomers and a rubber moiety of about 10 to 70% by weight, D. a block copolymer rubber of conjugated diene and alkenyl aromatic monomers, said diene monomer being present in at least 55% by weight of said copolymer, and E. a matrix copolymer of said alkenyl aromatic and alkenyl nitrile monomers, said polymeric blend having improved ductility at low temperatures.

PREFERRED EMBODIMENTS

The Diene Rubber

The preferred rubbers are diene rubbers, including mixtures of diene rubbers, i.e., any rubbery polymer (a rubbery polymer having a second order transition temperature not higher than 0° centigrade, preferably not highter than $-20°$ centigrade, as determined by ASTM Test D-746-52T) of one or more of the conjugated, 1,3-dienes, e.g. butadiene, isoprene, 2-chloro-1,3 butadiene, 1 chloro-1,3 butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tert-butylstyrene, etc.; an alphamethylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl-4-chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and vinylidene chlorides and bromides, etc.); and the like.

A preferred group of rubbers are the stereospecific polybutadiene rubbers formed by the polymerization of 1,3 butadiene. These rubbers have a cis-isomer content of about 30-98% and a trans-isomer content of about 70-2% and generally contain at least about 85% of polybutadiene formed by 1,4-addition with no more than about 15% by 1,2 addition. Mooney viscosities of the rubber (ML-4, 212° F.) can range from about 20 to 70 with a second order transition temperature of from about $-50°$ C. to $-105°$ C. as determined by ASTM Test D-746-52T.

The diene rubber used in preparing the first grafted diene rubber is a soluble diene rubber of the type described above. The stereospecific polybutadiene rubbers are the most preferred for optimum physical properties of the polyblend.

The diene rubbers used in the second and third grafted rubber is of the type described above being preformed rubbers by emulsion polymerization having a particle size of about 0.01 to 0.5 microns. A preferred group of rubbers are those consisting essentially of 75 to 100% by weight of butadiene and/or isoprene and up to 25% by weight of a monomer selected from the group consisting of monovinylidene aromatic hydrocarbons (e.g. styrene) and unsaturated nitriles (e.g. acrylonitrile), or mixtures thereof. Particularly advantageous substrates are butadiene homopolymer or an interpolymer of 90 to 95% by weight butadiene and 5 to 10% by weight of acrylonitrile or styrene. The diene rubber may contain up to about 2% of a crosslinking agent based on the weight of the rubber monomer or monomers. The crosslinking agent can be any of the agents conventionally employed for crosslinking diene rubbers, e.g. divinylbenzene, diallyl maleate, diallyl fumarate diallyl adipate, allyl acrylate, allyl methacrylate, diacrylates and dimethacrylates of polyhydric alcohols, e.g. ethylene glycol dimethyacrylate, etc.

Monomers

Exemplary of the monoalkenyl aromatic monomers that can be employed in the present process are styrene; alpha-alkyl monovinylidene monoaromatic compounds, e.g. alpha-methylstyrene, alpha-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc. If so desired, mixtures of such monovinylidene aromatic monomers may be employed.

Exemplary of the alkenyl nitriles which may be used in the interpolymers are acrylonitrile, methacrylonitrile, ethacrylonitrile and mixtures thereof.

Exemplary of the monomers which may be interpolymerized with the monoalkenylaromatic monomers are the alkyl alkacrylates, e.g., methyl methacrylate, ethyl methacrylate, ethyl ethacrylate, methyl ethacrylate.

First ABS Polyblend

A monomer formulation comprising at least principally a monoalkenyl aromatic monomer and an ethylenically unsaturated nitrile monomer having about 1.0 to 15% by weight of a diene rubber dissolved therein is charged continuously as a monomer-rubber solution to the initial reaction zone. The monomers are polymerized at temperatures of about 100°–150° C. in the first zone converting about 10–40% by weight of the monomers to a polymer as a first polymer. At least a portion of the first polymer polymerized is grafted as polymer molecules to the diene rubber as a superstrate.

Although the amount or polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 20 to 200:100 and most desirably about 30 to 150:100. With graft ratios about 30 to 150:100; a highly desirable degree of improvement in various properties generally is obtained.

The remainder of the first polymer formed is dissolved in said monomer composition as polymerized forming a monomer-polymer solution. The monomer-polymer solution or phase is incompatible with the monomer-rubber solution or phase and phase separation is observed by the well known Dobry effect. As the polymer concentration of the monomer-polymer-phase increases and has a volume slightly larger than the monomer-rubber phase, the monomer-rubber phase disperses as rubber-monomer particles aided by the shearing agitation of the stirred first reaction zone.

The agitation must be sufficient and of high enough shear to disperse and size the rubber particles uniformly throughout the monomer-polymer phase. The intensity of the stirring will vary with the size and geometry of the initial reactor, however, simple experimentation with a given stirred reactor will establish the sufficient amount of stirring needed to insure the homogeneous dispersion of the rubber particles throughout the monomer-polymer phase. The particle size of the rubber can be varied from a weight average particle diameter of from about 0.7 to 10 microns preferably from 0.7 to 5 microns to provide a balance between the impact strength and the gloss of the rubber reinforced polyblend. Higher stirring rates and shearing agitation can lower the size of the dispersed rubber particle, hence, must be controlled to provide sufficient stirring to size the particles to the predetermined size needed and insure homogeneous dispersion.

At steady state polymerization, in the initial polymerization zone, the continuously charged monomer composition containing 1.0 to 15% by weight diene rubber disperses almost instantaneously, under stirring, forming the rubber-monomer particles which on complete polymerization form discrete rubber particles. The conversion of monomers to polymers in the first reaction zone is controlled between 10–40% and must have a weight percent level that provides a polymer content in excess of the rubber content of the monomer composition to insure the dispersion of the monomer-rubber phase to a rubber-monomer particle phase having a predetermined size and being dispersed uniformly throughout the monomer-polymer phase.

The rubber particle becomes grafted with a first polymer in the first reaction zone which aids its dispersion and stabilizes the morphology of the particle. During the dispersion of the rubber-monomer particles, some monomer-polymer phase is occluded within the particles. The total amount of occluded monomer-polymer phase and grafted polymer present in the particles can be from about 1 to 5 parts for each part of said diene rubber.

The dispersed rubber phase increases the toughness of the ABS type polymeric polyblend as measured by its Izod impact strength by Test ASTM D-256-56. It has been found that the impact strength of polyblends increase with the weight percent rubber dispersed in the polyblend as used in the present invention. The impact strength is also determined by the size of the dispersed rubber particles, with the larger particles providing higher impact strength in the range of 0.7 to 10 microns measured as a weight average particle size diameter with a photosedimentometer by the published procedure of Graves, M. J. et.al., "Size Analysis of Subsieve Powders Using a Centrifugal Photosedimentometer," British Chemical Engineering 9:742–744 (1964). A Model 3000 Particle Size Analyzer from Martin Sweets Co., 3131 West Market Street, Louisville, Ky., was used.

The weight average diameter of the rubber particles also effects gloss wth smaller particles giving high gloss and the larger particles giving low gloss to the fabricated polyblend article such as a molding or sheet product. One must balance impact strength and gloss requirements in selecting an optimum rubber particle size. The range of 0.7 to 10 microns can be used for the large particles with the range of 0.7 to 5 microns being preferred and 0.8 to 3 microns being most preferred for optimum impact strength and gloss.

Processwise, in the initial reactor, one must (1) form and disperse the rubber particle, and (2) graft and stabilize the rubber particle maintaining its size and morphology or structure. The amount of occluded monomer-polymer phase described above is held at a predetermined level described above by steady state polymerization wherein the monomer is converted to polymer, at least a portion of which, grafts to the rubber stabilizing the rubber particle. It has been found that the higher the amount of occlusion stabilized within the rubber particle the more efficiently the rubber phase is used in toughening the polyblend. The rubber particle acts must as a pure rubber particle if the occlusions are controlled at the amount described above during their stabilization in the initial reaction zone and throughout the total polymerization process. The rubber particle is also grafted externally stabilizing its structure as to size and its dispersability in the monomer-polymer phase. The initial reactor forms a first partially polymerized mixture of a monomer polymer phase having the rubber phase described dispersed therein.

The first ABS polyblend can also be prepared by a mass/suspension process as disclosed in U.S. Pat. No. 3,509,237.

Second ABS Polyblend

Emulsion polymerization is preferred over mass or suspension polymerization for polymerizing rubber monomers for the second grafted diene rubber since such will provide a small particle size distribution which is preferred for use in the present invention. Furthermore, emulsion polymerization of rubber monomers produces a latex which is useful as a base or starting point for subsequent emulsion polymerization of the superstrate monomers onto the preformed rubber in the preparation of the second grafted diene rubber.

The second grafted rubber may be prepared by polymerizing superstrate monomers in the presence of the preformed rubber substrate, generally in accordance with conventional emulsion grafted polymerization techniques. The preferred processes use an emulsion technique to obtain the particle size of not more than about 0.5 microns for the graft copolymer which is preferred for use in the practice of the present invention. In such graft polymerization, a preformed rubber substrate generally is dissolved or dispersed in the monomers and this admixture is polymerized to combine chemically or graft a portion of the superstrate monomers upon the rubber substrate. Depending upon the ratio of monomers to rubber substrate and polymerization conditions, it is possible to regulate both the desired degree of grafting of the superstrate monomers onto the rubber substrate and the polymerization of ungrafted matrix copolymer. The ratio of monomers to rubber charged to the graft polymerization reaction zone in a primary determinant of the superstrate:substrate ratio of the resultant graft copolymer, although conditions of polymerization, rubber chemistry and particle size, rates of monomer addition, chain transfer agents, etc., may also exert an effect.

A polymerization catalyst is generally included and the amount used is generally within the range of from about 0.001 to 3.0 weight percent, and preferably from about 0.005 to 0.5 weight percent of the total polymerizable material, the exact amount depending upon the monomers and the desired polymerization cycle.

As is well known, it is often desirable to incorporate molecular weight regulators such as mercaptans, halides and terpenes in relatively small percentages by weight, on the order of from about 0.001 to 2.5 percent by weight of the polymerizable material. In addition, it may be desirable to include relatively small amounts of antioxidants or stabilizers, such as the conventional alkylated phenols and the like, although these may be added during or after polymerization.

In the emulsion polymerization grafting process, the monomers and rubber substrate are emulsified in water by use of suitable emulsifying agents, such as fatty acid soaps, alkali metal or ammonium soaps of high molecular weight, alkali or alkaryl sulfates and fulfonates, mineral acid salts of long chain aliphatic amines, etc. Emulsifying agents which have proven particularly advantageous are ammonium oleate, sodium palmitate, sodium stearate and other sodium soaps. Generally, the emulsifying agent is provided in amounts of from about 0.1 to 15 parts by weight per 100 parts by weight of the monomers and water is provided in an amount of from about 1 to 4 parts per part of monomers and even in larger ratios where greater dilution is desirable, all as those skilled in the art appreciate.

If desired, an aqueous latex formed in the emulsion polymerization of the rubber substrate may provide the aqueous medium onto which the monomers are grafted, with or without the addition of further emulsifying agents, water, and the like. However, the rubber may be dissolved in the monomers and the mixture emulsified or a latex thereof may be separately prepared. Various water soluble free radical polymerization initiators are conventionally used for emulsion polymerization of the rubber monomer, including conventional peroxy-and azo-catalysts, and the resulting latex may be used as the aqueous medium in which the graft copolymer monomers are admixed. In this manner, the catalyst for the rubber polymerization may function in whole or part as the catalyst for the graft polymerization. However, additional catalysts may be added at the time of graft polymerization.

Typical emulsion polymerization conditions involve temperatures in the range of from about 20° to 100° C. with agitation and preferably an inert atmosphere. Pressures of from about 1 to 100 pounds per square inch may be employed and monomers and/or additional catalysts may be added incrementally or continuously over a portion of the reaction cycle. Polymerization is preferably continued until substantially all, that is more than 90%, of the monomers have polymerized. The remaining monomers and other volatile components are then distilled away from the latex, preferably, which is then ready for further treatment.

Particle size of the emulsion latex graft particles may be varied by seeding, emulsifying agent concentration, agitation, rubber size variation through agglomeration prior to grafting, coagulation techniques, etc. Preferred agglomeration procedures are provided by Dalton's U.S. Pat. No. 3,558,541 and U.S. Pat. No. 3,551,370.

The particle size of the rubber has an effect upon the optimum grafting level for a graft copolymer. For example, a given weight percentage of smaller size rubber particles will provide considerably higher surface area for grafting than the equivalent weight of a larger size rubber particle. Accordingly, the density of grafting can be varied depending upon the size of the rubber particle. Generally, smaller graft polymer particles will tolerate a higher superstrate/substrate ratio than larger size particles.

The particle size of the rubber graft copolymer has a significant effect upon the gloss and physical properties of the product produced by the processes of this invention. Typically, the particle size of the graft copolymers used in the practice of the present invention may be varied from as littlle as about 0.01 microns to as large as about 0.5 microns and preferably from about 0.05 to 0.40 microns, depending upon the ultimate properties desired for a given product. A most preferred rubber graft copolymer for use in the practice of this invention are graft copolymers having a weight average particle size of from about 0.1 to 0.3 microns for the second grafted rubber.

For emulsion polymerization processes, the rubber desirably has a significant degree of crosslinking. With respect to the graft copolymers, at least some degree of crosslinking is inherent during the graft polymerization process and this desirably may be augmented through the addition of crosslinking agents or control of the polymerization conditions.

The rubber moiety of the second ABS polyblend can be about 2 to 50% by weight of the ABS polyblend. The rubber substrate is grafted with the superstrate monomers comprising alkenyl aromatic and alkenyl nitrile such that superstrate grafted copolymers are present by weight in amounts of 10 to 250 parts per 100 parts of rubber substrate preferably 40 to 100 parts. The ABS polyblend then is a blend of grafted diene rubber particles dispersed in copolymer comprised of the alkenyl aromatic and alkenyl nitrile monomers.

The Grafted Diene Rubber Terpolymer

This terpolymer is prepared by the emulsion process used for preparing the second ABS polyblend terpolymer wherein alkenyl aromatic and alkyl alkacrylate monomers are used instead of alkenyl aromatic and alkenyl nitrile monomers. The weight ratio of alkenyl aromatic monomers to alkyl alkacrylate monomers can range from about 1:10 to 2:1 in grafting the diene rubbers. The terpolymers are prepared by polymerizing 30 to 80% of a mixture of said alkenyl aromatic and alkyl alkacrylate monomers in the presence of 10 to 70% by weight of said preformed diene rubber contained in a latex by emulsion polymerization. The particle size of the preformed rubber particles contained in the latex is about 0.01 to 0.5 microns.

The Block Copolymer Rubbers

While the block copolymers to be utilized in the present invention may have from two to 40 alternating alkenyl aromatic and diene polymer blocks, the preferred copolymers have the general configuration

A—B—C wherein A is a polymer block of a alkenyl aromatic, B is a polymer block of a conjugated diene and C is either a polymer block of a alkenyl aromatic or a monomeric polymer terminating radical such as hydrogen, methyl, methoxyl, hydroxyl, carboxyl, carbonyl, sulfhydryl, etc. Thus, the two generally preferred types of block copolymers considered here may be said to be either 3-block copolymers or 2-block copolymers.

The alkenyl aromatic utilized in the preparation of these copolymers are typified by styrene but may be substituted styrenes such as alpha methyl styrene, ring methylated styrenes or vinyl naphthalenes. The conjugated dienes utilized in the formation of the polymer block B preferably have from 4–8 carbon atoms per molecule of which butadiene and isoprene are typical and preferred.

The methods by which these block copolymers are formed do not comprise an essential part of the present invention. Briefly, however, they usually are formed in their most desired molecular weight range by the use of alkali metal-containing organo catalysts capable of forming "living polymers," the several types of monomers being injected into the system in succession. Thus, when utilizing lithium based catalysts such as alkyl lithiums, it is preferred to form the first polymer block A by the use of styrene; allowing substantially all of the styrene to block polymerize and form a living polymer block, after which a conjugated diene such as butadiene is injected into the system; continuing polymerization to form the polymer block B thereof; and either terminating the block by the addition of methanol, water, oxygen or the like, or then injecting a further quantity of alkenyl aromatic to form polymer block C.

Block copolymers of more intricate structure are obtained by continuing the polymerization with alternating introduction of the two types of monomers to form successive blocks A—B—A—B—A—etc.

having an average molecular weight between about 65,000 to about 750,000.

In order to be most effective for the formation of the subject interpolymers, the blocks A should have average molecular weights between about 5,000 and 60,000, while the conjugated diene block B should have an average molecular weight between about 60,000 and 500,000. The most effective block copolymers should have between 2 and about 45% by weight of alkenyl aromatic polymer blocks and the intrinsic viscosity measured in toluene at room temperature should be between about 1 and 5.

The Matrix Copolymers

The monoalkenyl aromatic and alkenyl nitrile monomers are used in the matrix copolymer and are also used to graft the first and second grafted diene rubber terpolymers.

The polymerizable monomer mixtures contain at least 20% by weight of the monoalkenylaromatic monomer and preferable at least 50% by weight thereof. They also contain at least 5% by weight of the unsaturated nitrile and preferably at least 10% by weight thereof. From the standpoint of highly advantageous commercial practice, the monomer formulations contain 20 to 95% and preferably 60 to 85% by weight of the vinylidene aromatic hydrocarbon and 80 to 5% and preferably 40 to 15%, by weight of the unsaturated nitrile.

In addition to the monomers to be polymerized, the formulation can contain catalyst where required and other desirable components such as stabilizers, molecular weight regulators, etc.

The polymerization may be initiated by thermal monomeric free radicals, however, any free radical generating catalyst may be used in the practice of this invention including actinic irradiation. Conventional monomer-soluble peroxy and perazo catalysts may be used. Exemplary catalysts are di-tert-butyl peroxide, benzoyl peroxide, lauroyl peroxide, eleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5-di(tert-butylperoxy) hexane, 2,5-dimethyl-2,5-di(tert-butylperoxy) hexane-3 or hexyne-3, tert-butyl hydroperoxide, cumene hydroperoside, p-menthane hydroperoxide, cyclopentane hydroperoxide, pinane hydroperoxide, 2,5-dimethylhexane-2,5-dihydroperoxide, etc., and mixtures thereof.

The catalyst is generally included within the range of 0.001 to 3.0% by weight and preferably on the order of 0.005 to 1.0% by weight of the polymerizable material, depending primarily upon the monomer present.

As is well known, it is often desirable to incorporate molecular weight regulators such as mercaptans, halides and terpenes in relatively small percentages by weight, on the order of 0.001 to 1.0% by weight of the polymerizable material. From 2 to 20% diluents such as ethylbenzene, ethyltoluene, ethylxylene, diethylbenzene or benzene may be added to the monomer composition to control viscosities at high conversions and also provide some molecular weight regulation. In addition, it may be desirable to include relatively small amounts of antioxidants or stabilizers such as the conventional alkylated phenols. Alternatively, these may be added during or after polymerization. The formulation may also contain other additives such as plasticizers, lubricants, colorants and non-reactive preformed polymeric materials which are suitable or dispersible therein.

The monomers can be polymerized by mass, solution, suspension, mass/suspension or by emulsion processes conventionally used in the art. One suitable process for preparing such matrix copolymers is disclosed in U.S. Pat. No. 3,813,369.

The following examples are illustrative of the present invention and do not limit the scope and spirit of the invention.

EXAMPLE 1

Second ABS Polyblend

To a 250.0 parts of a latex of butadiene/acrylonitrile copolymer (93:7) containing 50.0% solids and approximately 1.0 part of rubber reserve soap as an emulsifier were added 70.0 parts water, 1.0 part rubber reserve soap and 1.0 part potassium persulfate.

This emulsion was heated to 65° centigrade with stirring and then there were added thereto over a period of about six hours 140.0 parts styrene, 60.0 parts acrylonitrile and 3.0 parts of terpinolene. The emulsion was held at temperature for one hour thereafter with stirring, cooled, coagulated by the addition of magnesium sulfate and the coagulant was then washed and dried. The resulting graft copolymer has a superstrate to substrate ratio of about 0.9:1.0 and a rubber particle size of about 0.14 microns.

EXAMPLE 2

First ABS Polyblend

Fourteen parts of a soluble butadiene rubber were dissolved in 26.0 parts of acrylonitrile and 60.0 parts styrene. There were added thereto 0.07 part of a mixture of tertbutyl peracetate, 0.05 part di-tert-butyl peroxide and stabilizers. The mixture was heated to 100° centigrade with stirring. Terpinolene was added as a chain transfer agent over a period of approximately five hours in an amount of about 0.1 part per hour for approximately five hours, at the end of which time an additional 0.4 part was added.

At 30.0 conversion of the monomers, the partially polymerized syrup was dispersed in 120.0 parts water to which was added 2.0 parts styrene and, as a suspending agent, 0.3 part of an interpolymer of 95.5 mol percent of acrylic acid and 4.5 mol percent of 2-ethylhexyl acrylate which has a specific viscosity of about 4.0 as determined in a 1.0% solution in water at 25° centigrade. The resulting suspension was stirred and heated to polymerize the remaining monomer, cooled, centrifuged, washed and dried to recover the second ABS polyblend in the form of small spherical beads.

The second ABS polyblend was analyzed and found to have a rubber particle size of about 1.2 microns. Said rubber particles had grafted and occluded polymer present in an amount of about 1.5 parts per part of rubber.

The rubbers can be analyzed for graft and occlusions along with swelling index by the well known gel tests. The first or second grafted rubber copolymers is dispersed in tetrahydrofuran (1 g/19 ml) which dissolves the polymer leaving the dispersed rubber as a gel phase. The rubber phase is separated from the dispersion by centrifuge as a gel and dried in a vacuum oven at 50° C. for 12 hours and weighed as a dry gel.

$$\% \text{ Dry Gel in Polyblend} = \frac{\text{Weight of dry gel}}{\text{Weight of polyblend}} \times 100$$

$$\left.\begin{array}{l}\% \text{ Graft and Occlusions} \\ \text{in Rubber}\end{array}\right\} = \frac{\% \text{ dry gel} - \% \text{ rubber}}{\text{Percent rubber*}} \times 100$$

*Percent rubber determined by infra-red spectrochemical analysis of the dry gel $$\left.\begin{array}{l}\text{Parts by weight of graft} \\ \text{polymer and occluded} \\ \text{polymer per unit} \\ \text{weight of rubber}\end{array}\right\} = \frac{\% \text{ dry gel} - \% \text{ rubber}}{\text{Percent rubber}}$$

The swelling index of the first grafted rubber can range from 2 to 40 preferably 5 to 20 whereas the swelling index of the second grafted rubber can range from 2-30, preferably 5-20.

The swelling index of the rubber graft particles is determined by taking the dry gel above and dispersing it in tetrahydrofuran for 12 hours. The gel is separated by centrifuge and the supernatant toluene drained free. The wet gel is weighed and then dried in a vacuum oven for 12 hours at 50° C. and weighed.

$$\text{Swelling Index} = \frac{\text{weight of wet gel}}{\text{weight of dry gel}}$$

EXAMPLE 3

Grafted Diene Rubber Terpolymer

Example 1 was repeated using a 188 parts of a monomer mixture of styrene (47 parts) and methyl methacrylate (141 parts). A terpolymer (MBS) was obtained having a rubber moiety of about 40%.

EXAMPLES 4–5

Polymeric blends were prepared using different portions of the materials prepared in Examples 1–3 in combination with block copolymer rubbers and matrix copolymer. The block copolymer rubbers had a butadiene/styrene weight ratio of about 70/30 of the AB type and the matrix copolymers (SAN) used had a styrene/acrylonitrile content of 75/25.

| Polymers | 4 Blend | 5 Blend |
|---|---|---|
| 1st ABS Polyblend | 10 | 15 |
| 2nd ABS Polyblend | 35 | 50 |
| Terpolymer (MBS) | 15 | 5 |
| Block Copolymer | 20 | 10 |
| SAN Copolymer | 20 | 20 |
| Gardner Impact (in.lbs.-20° F.) | 224 | 246 |
| Driven Dart Impact* (in.lbs.-20° F.) | 425 | 845 |
| Flexural Modulus (3" × 1" × 0.1" psi × 10$^{-5}$) | 142 | 200 |
| DTUL at 264 psi (¼" × ½" bar °F.) | 158 | 174 |
| Izod Impact Strength ft.lbs./in. notch | 6.5 | 9.2 |
| Type of Fracture | | |

-continued

| Polymers | 4 Blend | 5 Blend |
|---|---|---|
| by Driven dart | ductile | ductile |

*Driven Dart test - determines the multiaxial toughness of plastic wherein a 3" × 4" × 0.10" sheet is held in a ring clamp 2" in diameter and impacted with a dart 1½" in diameter driven at 6000"/min. at −20° F. The energy to fail (in.lbs.) is measured and the failure characterized as brittle or ductile.

Polymeric Blends

The polymeric blends comprise about 10 to 15 parts of the first ABS polyblend; 35 to 50 parts of the second ABS polyblend, 3 to 15 parts of the grafted conjugated diene terpolymer; 5 to 20 parts of the block copolymer of conjugated diene and alkenyl aromatic monomers and 15 to 25 parts of the matrix copolymer of alkenyl aromatic and alkenyl nitrile monomers.

What is claimed is:

1. A polymeric blend composition comprising:
   A. a first ABS type polyblend prepared by polymerizing a solution of a first conjugated diene rubber dissolved in alkenyl aromatic and alkenyl nitrile monomers, having first grafted conjugated diene rubber particles with a particle size of about 0.7 to 10 microns, said first diene rubber particles having present about 1 to 5 parts of a monoalkenyl aromatic-alkenyl nitrile copolymer as grafted and occluded copolymer, said first polyblend having a rubber moiety present in an amount of about 1 to 15% by weight based on said first ABS polyblend,
   B. a second ABS type polyblend prepared by polymerizing alkenyl aromatic and alkenyl nitrile monomers in the presence of a second conjugated diene rubber dispersed as rubber particles in an aqueous latex, having second grafted conjugated diene rubber particles with a particle size of about 0.01 to 0.50 microns, said second diene rubber particles being grafted with said copolymer as a superstrate in an amount of about 0.10 to 2.5 parts per part of diene rubber, said second polyblend having a rubber moiety present in an amount of about 2 to 50% by weight of said second ABS polyblend,
   C. a grafted conjugated diene rubber terpolymer said diene rubber grafted with alkenyl aromatic and alkyl alkacrylate monomers and a rubber moiety of about 10 to 70% by weight,
   D. a block copolymer rubber of conjugated diene and alkenyl aromatic monomers, said diene monomer being present in at least 55% by weight of said copolymer, and
   E. a matrix copolymer of said alkenyl aromatic and alkenyl nitrile monomers, said polymeric blend having by weight, 10 to 15 parts of (A), 35 to 50 parts of (B), 3 to 15 parts of (C), 5 to 20 parts of (D), and 15 to 25 parts of (E), and having improved ductility at low temperatures.

2. A composition of claim 1 wherein said alkenyl aromatic monomer is selected from the group consisting of styrene, alpha methylstyrene, halostyrene, vinyl toluene and mixtures thereof.

3. A composition of claim 1 wherein said alkenyl nitrile monomer is selected from the group consisting of acrylonitrile, methacrylonitrile and mixtures thereof.

4. A composition of claim 1 wherein said conjugated diene rubber is polybutadiene, isoprene, chloroprene, copolymers of butadiene-styrene, butadiene-acrylonitrile, butadiene-methyl methacrylate wherein said diene rubber has a diene monomer present in an amount of at least 50% by weight.

5. A composition of claim 1 wherein said alkyl alkacrylate monomer is methyl methacrylate, ethyl methacrylate ethyl ethacrylate and methyl ethacrylate or mixtures thereof.

6. A composition of claim 1 wherein said copolymer has said alkenyl aromatic and said alkenyl nitrile monomers present in a weight ratio of about 60:40 to 85:15.

7. A composition of claim 1 wherein said matrix copolymer has present said alkenyl aromatic and alkenylaromatic in a weight ratio of 60:40 to 85:15.

8. A composition of claim 1 wherein said third terpolymer is prepared by polymerizing 30 to 80% by weight of a mixture of said alkenyl aromatic and alkyl alkacrylate monomers in the presence of 10 to 70% by weight of said diene rubber.

9. A composition of claim 8 wherein said mixture has a weight ratio of alkenyl aromatic to alkyl alkacrylate monomers of about 1:10 to 2:1.

10. A composition of claim 1 wherein said block copolymer rubber has a weight ratio of diene rubber to said alkenyl aromatic monomer of about 55:45 to 98:2.

11. A composition of claim 1 wherein said grafted conjugated diene rubber terpolymer is prepared by polymerizing a monomer mixture of monoalkenyl aromatic and alkyl alkacrylate monomers in the presence of a latex containing a third conjugated diene rubber as rubber particles having a particle size of about 0.01 to 0.50 microns, said terpolymer having said third diene rubber moiety present in an amount of about 10 to 70% by weight.

12. A polymeric blend composition comprising:
   A. a first ABS polyblend having first grafted conjugated diene rubber particle with a particle size of about 1 to 5 microns, said first diene rubber particles having present about 1 to 5 parts of a styrene-acrylonitrile copolymer as grafted and occluded polymer, said first diene rubber particles having a rubber moiety present in an amount of about 1 to 15% by weight,
   B. a second ABS polyblend having second grafted conjugated diene rubber particles with a particle size of about 0.01 to 0.50 microns, said second diene rubber particles being grafted with said copolymer as a superstrate in an amount of about 0.10 to 2.5 parts per part of diene rubber, said second grafted rubber particles having a rubber moiety present in an amount of about 2 to 50% by weight of said second ABS polyblend,
   C. a grafted conjugated diene rubber terpolymer, said diene rubber grafted with styrene and methylmethacrylate monomers and a rubber moiety of about 10 to 70% by weight,
   D. a block copolymer of butadiene and styrene,
   E. a matrix copolymer of styrene and acrylonitrile, said polymeric blend having by weight, 10 to 15 parts of (A), 35 to 50 parts of (B), 3 to 15 parts of (C), 5 to 20 parts of (D) and 15 to 25 parts of E, and having improved ductility at low temperatures.

* * * * *